US009390065B2

(12) United States Patent
Kosko et al.

(10) Patent No.: US 9,390,065 B2
(45) Date of Patent: Jul. 12, 2016

(54) ITERATIVE ESTIMATION OF SYSTEM PARAMETERS USING NOISE-LIKE PERTURBATIONS

(71) Applicants: Bart Kosko, Hacienda Heights, CA (US); Osonde Osoba, Los Angeles, CA (US); Sanya Mitaim, Bangkok (TH)

(72) Inventors: Bart Kosko, Hacienda Heights, CA (US); Osonde Osoba, Los Angeles, CA (US); Sanya Mitaim, Bangkok (TH)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 469 days.

(21) Appl. No.: 13/949,048

(22) Filed: Jul. 23, 2013

(65) Prior Publication Data

US 2014/0025356 A1 Jan. 23, 2014

Related U.S. Application Data

(60) Provisional application No. 61/674,615, filed on Jul. 23, 2012.

(51) Int. Cl.
*G06F 7/60* (2006.01)
*G06F 17/10* (2006.01)
*G06F 17/18* (2006.01)
*G06K 9/62* (2006.01)

(52) U.S. Cl.
CPC ............... *G06F 17/10* (2013.01); *G06F 17/18* (2013.01); *G06K 9/6226* (2013.01); *G06K 9/6298* (2013.01)

(58) Field of Classification Search
CPC ...... G01C 19/38; G01C 21/165; G05B 17/02; G01S 3/8083; G06K 9/103; G06K 9/03; G06F 19/12; G06F 17/5009
See application file for complete search history.

(56) References Cited

U.S. PATENT DOCUMENTS

| 2003/0216896 | A1* | 11/2003 | Betts | G05B 17/02 703/2 |
| 2006/0293873 | A1* | 12/2006 | Gardner | G06F 19/12 703/11 |
| 2007/0118286 | A1* | 5/2007 | Wang | G01C 21/165 342/357.59 |
| 2007/0244575 | A1* | 10/2007 | Wojsznis | G05B 17/02 700/38 |
| 2008/0247274 | A1* | 10/2008 | Seltzer | G01S 3/8083 367/125 |
| 2011/0064278 | A1* | 3/2011 | Wu | G06K 9/03 382/112 |
| 2011/0093250 | A1* | 4/2011 | Lin | G01C 19/38 703/7 |

(Continued)

OTHER PUBLICATIONS

Osoba et al., "Noise benefits in expctation maximization algorithms: NEM theorems and models", IEEE 2011.*

(Continued)

*Primary Examiner* — Kandasamy Thangavelu
(74) *Attorney, Agent, or Firm* — McDermott Will & Emery LLP (57) ABSTRACT

An estimating computer system may iteratively estimate an unknown parameter of a model or state of a system. An input module may receive numerical data about the system. A noise module may generate random, chaotic, or other type of numerical perturbations of the received numerical data and/or may generate pseudo-random noise. An estimation module may iteratively estimate the unknown parameter of the model or state of the system based on the received numerical data. The estimation module may use the numerical perturbations and/or the pseudo-random noise and the input numerical data during at least one of the iterative estimates of the unknown parameter. A signaling module may signal when successive parameter estimates or information derived from successive parameter estimates differ by less than a predetermined signaling threshold or when the number of estimation iterations reaches a predetermined number.

14 Claims, 3 Drawing Sheets

(56) References Cited

U.S. PATENT DOCUMENTS

| | | |
|---|---|---|
| 2016/0005399 A1 | 1/2016 | Audhkhasi et al. |
| 2016/0019459 A1 | 1/2016 | Audhkhasi et al. |
| 2016/0034814 A1 | 2/2016 | Audhkhasi et al. |

OTHER PUBLICATIONS

Audhkhasi, K. et al. 2013. Noisy Hidden Markov Models for Speech Recognition. In 2013 International Joint Conference on Neural Networks, Proceedings (IJCNN-2013), 8 pages.

Audhkhasi, K. et al. 2013. Noise Benefits in Backpropagation and Deep Bidirectional Pre-Training. In 2013 International Joint Conference on Neural Networks, Proceedings (IJCNN-2013), 6 pages.

Osoba, O. et al. 2011. Noise Benefits in the Expectation-Maximization Algorithm: NEM Theorems and Models. Proceedings of International Joint Conference on Neural Networks, San Jose, California, USA, Jul. 31-Aug. 5, 2011, pp. 3178-3183.

Osoba, O.A. 2013. Noise Benefits in Expectation-Maximization Algorithms. A Dissertation Presented to the Faculty of the USC Graduate School, University of Southern California, in partial fulfillment of the requirements for the degree Doctor of Philosophy (Electrical Engineering), Aug. 2013, 256 pages.

Osoba, O. et al. 2013. The Noisy Expectation-Maximization Algorithm. In Fluctuation and Noise Letters, 31 pages.

Osoba, O. et al. 2013. Noise-Enhanced Clustering and Competitive Learning Algorithms. Neural Networks, vol. 37, pp. 132-140.

Osoba, O. et al. 2013. Erratum to Noise-Enhanced Clustering and Competitive Learning Algorithms. Neural Networks, vol. 37, 1 page.

An, G. 1996. The Effects of Adding Noise During Backpropagation Training on a Generalization Performance. Neural Computation, vol. 8, No. 3, pp. 643-674, 1996.

Bishop, C.M. 1995. Training with Noise is Equivalent to Tikhonov Regularization. Neural Computation, vol. 7, No. 1, pp. 108-116, 1995.

Fessler, J.A. et al. 1994. Space-Alternating Generalized Expectation-Maximization Algorithm. IEEE Transactions on Signal Processing, vol. 42, pp. 2664-2677.

Franzke, B. et al. 2011. Noise can speed convergence in Markov chains. Physical Review E 84 (2011) Apr. 11, 2012.

Hudson, H.M. et al. 1994. Accelerated Image Reconstruction using Ordered Subsets of Projection Data. IEEE Transactions on Medical Imaging, vol. 13, pp. 601-609.

Adair, R. K. et al. 1998. Detection of Weak Electric Fields by Sharks, Rays and Skates Chaos: Focus Issue on the constructive Role of Noise in Fluctuation Driven Transport and Stochastic Resonance, vol. 8, pp. 576-587.

Ambroise, C. et al. 1997. Clustering of spatial data by the em algorithm. Quantitative Geology and Geostatistics vol. 9, pp. 493-504.

Bacchetti, P. 1990. Estimating the incubation period of AIDS by comparing population infection and diagnosis patterns. Journal of the American Statistical Association, vol. 85, pp. 1002-1008.

Bailey, T. L. et al.1995. Unsupervised learning of multiple motifs in biopolymers using expectation maximization. Machine learning, vol. 21, pp. 51-80.

Boyles, R. A. 1983. On the convergence of the EM algorithm. Journal of the Royal Statistical Society. Series B (Methodological) vol. 45, pp. 47-50.

Brey, J. J. 1996. Stochastic Resonance in a One-Dimension Ising Model. Physics Letters A 216, pp. 240-246.

Bulsara, A.R. et al. 1996. Threshold Detection of Wideband Signals: A Noise-Induced Maximum in the Mutual Information. Physical Review E 54 (1996), pp. R2185-R2188.

Bulsara, A.R. et al. 1996. Tuning in to Noise. Physics Today (1996), pp. 39-45.

Carreira-Perpiñán, M. Á. 2005. Gaussian mean shift in an EM algorithm. IEEE Trans. on Pattern Analysis and Machine Intelligence, vol. 29, p. 2007.

Celeux, G. et al. 1988. A Random Imputation Principle: The Stochastic EM Algorithm. Rapports de Recherche No. 901, 1988.

Celeux, G. et al. 1992. A Classification EM Algorithm for Clustering and Two Stochastic Versions. Computational Statistics & Data Analysis, vol. 14, pp. 315-332.

Celeux, G. et al. 2001. A component-wise EM algorithm for mixtures. Journal of Computational and Graphical Statistics, vol. 10, pp. 697-712.

Cerny, V. 1985. Thermodynamical approach to the Traveling Salesman Problem: An efficient simulation algorithm. Journal of Optimization Theory and Applications, vol. 45, pp. 41-51.

Chapeau-Blondeau, F. et al. 2004. Noise-Enhanced Performance for an Optimal Bayesian Estimator. IEEE Transactions on Signal Processing, vol. 52, pp. 1327-1334.

Chauveau, D. 1995. A stochastic EM algorithm for mixtures with censored data. Journal of Statistical Planning and Inference, vol. 46, pp. 1-25.

Chen, H. et al. 2009. Noise Enhanced Nonparametric Detection, IEEE Transactions on Information Theory, vol. 55, pp. 499-506.

Cordo, P. et al. 1996. Noise in Human Muscle Spindles. Nature, vol. 383, pp. 769-770.

Delmas, J. P. 1997. An equivalence of the EM and ICE algorithm for exponential family. IEEE Transactions on Signal Processing, vol. 45, pp. 2613-2615.

Dempster, P. et al. 1977. Maximum Likelihood from Incomplete Data via the EM Algorithm (with discussion). Journal of the Royal Statistical Society, Series B 39, pp. 1-38.

Förster, A. et al. 1996. Stochastic Resonance in Chemistry. 2. The Peroxidase-Oxidase Reaction. Journal of Physical Chemistry vol. 100 (1996), pp. 4442-4447.

Gammaitoni, L. et al. 1998. Stochastic Resonance. Reviews of Modem Physics, vol. 70, pp. 223-287.

Geman, S. et al. Diffusions for global optimization. SIAM Journal on Control and Optimization, vol. 24, pp. 1031-1043.

Gupta, M. R. et al. 2010. Theory and Use of the EM Algorithm. Foundations and Trends in Signal Processing, vol. 4, pp. 223-296.

Hajek, B. 1988. Cooling schedules for optimal annealing. Mathematics of operations research (1988), pp. 311-329.

Hänggi, P. 2002. Stochastic resonance in biology. ChemPhysChem vol. 3, pp. 285-290.

Hasselblad, V. 1966. Estimation of Parameters for a Mixture of Normal Distributions. Technometrics, vol. 8, pp. 431-444.

Hathaway, R. J. 1986. Another interpretation of the EM algorithm for mixture distributions. Statistics & Probability Letters, vol. 4, pp. 53-56.

Juang, B. H. et al. 1991. Hidden Markov models for speech recognition. Technometrics, vol. 33, pp. 251-272.

Kirkpatrick, S. et al. 1983. Optimization by simulated annealing. Science, vol. 220, pp. 671-680.

Kosko, B. 1991. Neural Networks and Fuzzy Systems: A Dynamical Systems Approach to Machine Intelligence (Prentice-Hall, 1991): "The Backpropagation Algorithm," pp. 196-199.

Kosko, B. 2006. Noise (Viking, 2006). Chapter 6: The Zen of Noise: Stochastic Resonance, pp. 147-155.

Kramers, H. A. 1940. Brownian Motion in a Field of Force and the Diffusion Model of Chemical Reactions. Physica VII, pp. 284-304.

Lawrence, C. E. et al. 1990. An expectation maximization (EM) algorithm for the identification and characterization of common sites in unaligned biopolymer sequences. Proteins: Structure, Function, and Bioinformatics, vol. 7, pp. 41-51.

Liu, C. et al. 1994. The ECME algorithm: a simple extension of EM and ECM with faster monotone convergence. Biometrika, vol. 81, p. 633.

McLachlan, G.J. et al. 2007. The EM Algorithm and Extensions (John Wiley and Sons, 2007). Excerpted pp. 82-85, 18-19, and 289.

Meng X. L. et al. 1993. Maximum Likelihood Estimation via the ECM algorithm: A general framework. Biometrika, vol. 80, p. 267-.

Meng, X. L. et al. 1991. Using EM to obtain asymptotic variance-covariance matrices: The SEM algorithm. Journal of the American Statistical Association, vol. 86, pp. 899-909.

Patel, A. et al. 2011. Noise Benefits in Quantizer-Array Correlation Detection and Watermark Decoding. IEEE Transactions on Signal Processing vol. 59, pp. 488-505.

(56) References Cited

OTHER PUBLICATIONS

Rabiner, L. R. 1989. A tutorial on hidden Markov models and selected applications in speech recognition. Proceedings of the IEEE, vol. 77, pp. 257-286.

Redner, R. A. et al. 1984. Mixture Densities, Maximum Likelihood and the EM algorithm. SIAM Review, vol. 26, pp. 195-239.

Reilly, M. et al. 1999. A likelihood-based method of identifying contaminated lots of blood product. International Journal of Epidemiology, vol. 28, pp. 787-792.

Shepp, L. A. et al. 1982. Maximum likelihood reconstruction for emission tomography. IEEE Transactions on Medical Imaging, vol. 1, pp. 113-122.

Sundberg, R. 1974. Maximum likelihood theory for incomplete data from an exponential family. Scandinavian Journal of Statistics, pp. 49-58.

Wang, J. et al. 2006. Maximum likelihood estimation of compound-gaussian clutter and target parameters. IEEE Transactions on Signal Processing, vol. 54, pp. 3884-3898.

Wu, C. F. J. 1983. On the Convergence Properties of the EM Algorithm. The Annals of Statistics vol. 11, pp. 95-103.

Xu, L. et al. 1996. On convergence properties of the EM algorithm for gaussian mixtures. Neural computation, vol. 8, pp. 129-151.

Zhang, Y. et al. 2001. Segmentation of Brain MR Images through a Hidden Markov Random Field Model and the Expectation-Maximization Algorithm. IEEE Transactions on Medical Imaging, vol. 20, pp. 45-57.

Folland, G.B. 1984, Real Analysis: Modern Techniques and Their Application. A Wiley-Interscience Publication, John Wiley & Sons, Inc., New York. Title, Preface, and Table of Contents (5 pages).

Gershenfeld, N. 1999. The Nature of Mathematical Modeling. Cambridge University Press, Cambridge, UK. Title, Preface, and Table of Contents (7 pages).

Tanner, M.A. 1993. Tools for Statistical Inference: Methods for the Exploration of Posterior Distributions and Likelihood Functions, Second Edition. Springer-Verlag, New York. Title, Preface, and Table of Contents (4 pages).

\* cited by examiner

ITERATIVE ESTIMATION OF SYSTEM PARAMETERS USING NOISE-LIKE PERTURBATIONS

CROSS-REFERENCE TO RELATED APPLICATION

This application is based upon and claims priority to U.S. provisional patent application 61/674,615, entitled "NOISE-ENHANCED EXPECTATION-MAXIMIZATION ALGORITHM," filed Jul. 23, 2012. The entire content of this application is incorporated herein by reference.

BACKGROUND

1. Technical Field

This disclosure relates to iterative estimates of an unknown parameter of a model or state of a system.

2. Description of Related Art

The expectation-maximization (EM) algorithm is an iterative statistical algorithm that estimates maximum-likelihood parameters from incomplete or corrupted data. See A. P. Dempster, N. M. Laird and D. B. Rubin, "Maximum Likelihood from Incomplete Data via the EM Algorithm (with discussion)," Journal of the Royal Statistical Society, Series B 39 (1977) 1-38; G. J. McLachlan and T. Krishnan, The EM Algorithm and Extensions (John Wiley and Sons, 2007); M. R. Gupta and Y. Chen, "Theory and Use of the EM Algorithm," Foundations and Trends in Signal Processing 4 (2010) 223-296. This algorithm has a wide array of applications that include data clustering, see G. Celeux and G. Govaert, "A Classification EM Algorithm for Clustering and Two Stochastic Versions," Computational Statistics & Data Analysis 14 (1992) 315-332; C. Ambroise, M. Dang and G. Govaert, "Clustering of spatial data by the em algorithm," Quantitative Geology and Geostatistics 9 (1997) 493-504, automated speech recognition, see L. R. Rabiner, "A tutorial on hidden Markov models and selected applications in speech recognition," Proceedings of the IEEE 77 (1989) 257-286; B. H. Juang and L. R. Rabiner, "Hidden Markov models for speech recognition," Technometrics 33 (1991) 251-272, medical imaging, see L. A. Shepp and Y. Vardi, "Maximum likelihood reconstruction for emission tomography," IEEE Transactions on Medical Imaging 1 (1982) 113-122; Y. Zhang, M. Brady and S. Smith, "Segmentation of Brain MR Images through a Hidden Markov Random Field Model and the Expectation-Maximization Algorithm," IEEE Transactions on Medical Imaging 20 (2001) 45-57, genome-sequencing, see C. E. Lawrence and A. A. Reilly, "An expectation maximization (EM) algorithm for the identification and characterization of common sites in unaligned biopolymer sequences," Proteins: Structure, Function, and Bioinformatics 7 (1990) 41-51; T. L. Bailey and C. Elkan, "Unsupervised learning of multiple motifs in biopolymers using expectation maximization," Machine learning 21 (1995) 51-80, radar denoising, see J. Wang, A. Dogandzic and A. Nehorai, "Maximum likelihood estimation of compound-gaussian clutter and target parameters," IEEE Transactions on Signal Processing 54 (2006) 3884-3898, and infectious-disease tracking, see M. Reilly and E. Lawlor, "A likelihood-based method of identifying contaminated lots of blood product," International Journal of Epidemiology 28 (1999) 787-792; P. Bacchetti, "Estimating the incubation period of AIDS by comparing population infection and diagnosis patterns," Journal of the American Statistical Association 85 (1990) 1002-1008. A prominent mathematical modeler has even said that the EM algorithm is "as close as data analysis algorithms come to a free lunch", see N. A. Gershenfeld, The Nature of Mathematical Modeling (Cambridge University Press, 1999). But the EM algorithm can converge slowly for high-dimensional parameter spaces or when the algorithm needs to estimate large amounts of missing information, see G. J. McLachlan and T. Krishnan, The EM Algorithm and Extensions (John Wiley and Sons, 2007); M. A. Tanner, Tools for Statistical Inference: Methods for the Exploration of Posterior Distributions and Likelihood Functions, Springer Series in Statistics (Springer, 1996).

SUMMARY

An estimating system may iteratively estimate an unknown parameter of a model or state of a system. An input module may receive numerical data about the system. A noise module may generate random, chaotic, or other type of numerical perturbations of the received numerical data and/or may generate pseudo-random noise. An estimation module may iterativel estimate the unknown parameter of the model or state of the system based on the received numerical data. The estimation module may use the numerical perturbations and/or the pseudo-random noise and the input numerical data during at least one of the iterative estimates of the unknown parameter. A signaling module may determine whether successive parameter estimates or information derived from successive parameter estimates differ by less than a predetermined signaling threshold and, if so, signal when this occurs.

The estimation module may estimate the unknown parameter of the model or state of the system using maximum likelihood, expectation-maximization, minorization-maximization, or another statistical optimization or sub-optimization method.

The noise module may generate random, chaotic, or other type of numerical perturbations of the input numerical data that fully or partially satisfy a noisy expectation maximization (NEM) condition. The estimation module may estimate the unknown parameter of the model or state of the system by adding, multiplying, or otherwise combining the received numerical data with these numerical perturbations.

The estimation module may cause the magnitude of the generated numerical perturbations to eventually decay during successive parameter estimates.

The noise module may generate numerical perturbations that do not depend on the received numerical data. The estimation module may estimate the unknown parameter of the model or state of the system using the numerical perturbations that do not depend on the received numerical data.

The system may be a model that is a probabilistically weighted mixture of probability curves, including a scalar or vector Gaussian and Cauchy curves. The noise module may cause the generated numerical perturbations and/or pseudo-random noise to fully or partially satisfy a mixture-based NEM condition, including a component-wise quadratic NEM condition.

Non-transitory, tangible, computer-readable storage media may contain a program of instructions that may cause a computer system running the program of instruction to function as any of the estimating computer systems that are described herein or any of their components.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Overview

A noise-injected version of the Expectation-Maximization (EM) algorithm is presented: the Noisy Expectation Maximization (NEM) algorithm. The NEM algorithm may use noise to speed up the convergence of the EM algorithm. The NEM theorem shows that additive noise can speed up the average convergence of the EM algorithm to a local maximum of the likelihood surface if a positivity condition holds. Corollary results give special cases when noise improves the EM algorithm such as in the case of the Gaussian mixture model (GMM) and the Cauchy mixture model (CMM). The NEM positivity condition may simplify to a quadratic inequality in the GMM and CMM cases. A final theorem shows that the noise benefit for independent identically distributed additive noise may decrease with sample size in mixture models. This theorem implies that the noise benefit may be most pronounced if the data is sparse.

I. Introduction

Careful noise injection can increase the average convergence speed of the EM algorithm. It may also derive a general sufficient condition for this EM noise benefit. Simulations show this EM noise benefit include the ubiquitous Gaussian mixture model (FIG. 1), the Cauchy mixture model, and the censored gamma model (FIG. 2). The simulations in FIG. 3 also show that the noise benefit may be faint or absent if the system simply injects blind noise that ignores the sufficient condition. This suggests that the noise benefit sufficient condition may also be necessary for some data models. The discussion concludes with results that show that the noise benefit tends to occur most sharply in sparse data sets.

The EM noise benefit may be an example of stochastic resonance in statistical signal processing. Stochastic resonance may occur when noise improves a signal system's performance, see A. R. Bulsara and L. Gammaitoni, "*Tuning in to Noise*," Physics Today (1996) 39-45; L. Gammaitoni, P. Hänggi, P. Jung and F. Marchesoni, "*Stochastic Resonance*," Reviews of Modern Physics 70 (1998) 223-287; B. Kosko, *Noise* (Viking, 2006): small amounts of noise may improve the performance while too much noise may degrade it. Much early work on noise benefits involved natural systems in physics, see J. J. Brey and A. Prados, "*Stochastic Resonance in a One-Dimension Ising Model*," Physics Letters A 216 (1996) 240-246, chemistry, see H. A. Kramers, "*Brownian Motion in a Field of Force and the Diffusion Model of Chemical Reactions*," Physica VII (1940) 284-304; A. Förster, M. Merget and F. W. Schneider, "*Stochastic Resonance in Chemistry. 2. The Peroxidase-Oxidase Reaction*," Journal of Physical Chemistry 100 (1996) 4442-4447, and biology, see F. Moss, A. Bulsara and M. Shlesinger, eds., Journal of Statistical Physics, Special Issue on Stochastic Resonance in Physics and Biology (Proceedings of the NATO Advanced Research Workshop), volume 70, no. 1/2 (Plenum Press, 1993); P. Cordo, J. T. Inglis, S. Vershueren, J. J. Collins, D. M. Merfeld, S. Rosenblum, S. Buckley and F. Moss, "*Noise in Human Muscle Spindles*,", Nature 383 (1996) 769-770; R. K. Adair, R. D. Astumian and J. C. Weaver, "*Detection of Weak Electric Fields by Sharks, Rays and Skates*," Chaos: Focus Issue on the Constructive Role of Noise in Fluctuation Driven Transport and Stochastic Resonance 8 (1998) 576-587; P. Hänggi, "*Stochastic resonance in biology*," ChemPhysChem 3 (2002) 285-290. This work inspired the search for noise benefits in nonlinear signal processing and statistical estimation. See A. R. Bulsara and A. Zador, "*Threshold Detection of Wideband Signals: A Noise-Induced Maximum in the Mutual Information*," Physical Review E 54 (1996) R2185R2188; F. Chapeau-Blondeau and D. Rousseau, "*Noise-Enhanced Performance for an Optimal Bayesian Estimator*," IEEE Transactions on Signal Processing 52 (2004) 1327-1334; M. McDonnell, N. Stocks, C. Pearce and D. Abbott, Stochastic resonance: from suprathreshold stochastic resonance to stochastic signal quantization (Cambridge University Press, 2008); H. Chen, P. Varshney, S. Kay and J. Michels, "*Noise Enhanced Nonparametric Detection*," IEEE Transactions on Information Theory 55 (2009) 499-506; A. Patel and B. Kosko, "*Noise Benefits in Quantizer-Array Correlation Detection and Watermark Decoding*," IEEE Transactions on Signal Processing 59 (2011) 488-505; B. Franzke and B. Kosko, "*Noise can speed convergence in Markov chains*," Physical Review E 84 (2011) 041112. The EM noise benefit may not involve a signal threshold unlike almost all SR noise benefits, see L. Gammaitoni, P. Hänggi, P. Jung and F. Marchesoni, "*Stochastic Resonance*," Reviews of Modern Physics 70 (1998) 223-287.

The next sections develop theorems and algorithms for Noisy Expectation-Maximization (NEM). Section 2 summarizes the key facts of the Expectation-Maximization algorithm. Section 3 introduces the theorem and corollaries that underpin the NEM algorithm. Section 4 presents the NEM algorithm and some of its variants. Section 5 presents a theorem that describes how sample size may affect the NEM algorithm for mixture models when the noise is independent and identically distributed (i.i.d.).

II. The EM Algorithm

The EM algorithm is an iterative maximum-likelihood estimation (MLE) method for estimating pdf parameters from incomplete observed data. See A. P. Dempster, N. M. Laird and D. B. Rubin, "*Maximum Likelihood from Incomplete Data via the EM Algorithm (with discussion)*," Journal of the Royal Statistical Society, Series B 39 (1977) 1-38; G. J. McLachlan and T. Krishnan, The EM Algorithm and Extensions (John Wiley and Sons, 2007); M. R. Gupta and Y. Chen, "*Theory and Use of the EM Algorithm*," Foundations and Trends in Signal Processing 4 (2010) 223-296, EM may compensate for missing information by taking expectations over all missing information conditioned on the observed incomplete information and on current parameter estimates. A goal of the EM algorithm is to find the maximum-likelihood estimate $\hat{\theta}$ for the pdf parameter $\theta$ when the data Y has a known parametric pdf $f(y|\theta)$. The maximumlikelihood estimate $\hat{\theta}$ is $$\hat{\theta} = \underset{\theta}{\operatorname{argmax}} \ell(\theta|y) \quad (1)$$

where $l(\theta|y)=\ln f(y|\theta)$ is the log-likelihood (the log of the likelihood function).

The EM scheme may apply when an incomplete data random variable $Y=r(X)$ is observed instead of the complete data random variable X. The function r: $X \to Y$ may model data corruption or information loss. $X=(Y,Z)$ can denote the complete data X, where Z is a latent or missing random variable. Z may represent any statistical information lost during the observation mapping $r(X)$. This corruption may make the observed data log-likelihood $l(\theta|y)$ complicated and difficult to optimize directly in (1).

The EM algorithm may address this difficulty by using the simpler complete log-likelihood $l(\theta|y,z)$ to derive a surrogate function $Q(\theta|\theta_k)$ for $l(\theta|y)$. $Q(\theta|\theta_k)$ is the average of $l(\theta|y, z)$ over all possible values of the latent variable Z, given the observation $Y=y$ and the current parameter estimate $\theta_k$:

$$Q(\theta|\theta_k) = \mathbb{E}_Z[\ell(\theta|y, Z)|Y = y, \theta_k] \quad (2)$$

$$= \int_Z \ell(\theta|y, z) f(z|y, \theta_k) dz.$$

A. P. Dempster, N. M. Laird and D. B. Rubin, "*Maximum Likelihood from Incomplete Data via the EM Algorithm (with discussion)*," Journal of the Royal Statistical Society, Series B 39 (1977) 1-38, first showed that any $\theta$ that increases $Q(\theta|\theta_k)$ cannot reduce the log-likelihood difference $l(\theta|y)-l(\theta_k|y)$. This "ascent property" led to an iterative method that performs gradient ascent on the log-likelihood $l(\theta|y)$. This result underpin the EM algorithm and its many variants, see G. Celeux and J. Diebolt, "*The SEM algorithm: A Probabilistic Teacher Algorithm Derived from the EM Algorithm for the Mixture Problem*," Computational Statistics Quarterly 2 (1985) 73-82; G. Celeux and G. Govaert, "*A Classification EM Algorithm for Clustering and Two Stochastic Versions*," Computational Statistics & Data Analysis 14 (1992) 315-332; X. L. Meng and D. B. Rubin, "*Maximum Likelihood Estimation via the ECM algorithm: A general framework*," Biometrika 80 (1993) 267; C. Liu and D. B. Rubin, "*The ECME algorithm: a simple extension of EM and ECM with faster monotone convergence*" Biometrika 81 (1994) 633; J. A. Fessler and A. O. Hero, "*Space-Alternating Generalized Expectation-Maximization Algorithm*," IEEE Transactions on Signal Processing 42 (1994) 2664-2677; H. M. Hudson and R. S. Larkin, "*Accelerated Image Reconstruction using Ordered Subsets of Projection Data*," IEEE Transactions on Medical Imaging 13 (1994) 601-609.

The following notation for expectations to avoid cumbersome equations are used:

$$\mathbb{E}_{S|t,\phi}[g(S, t, \theta)] \equiv \mathbb{E}_S[g(S, T, \theta)|T = t, \phi]$$

$$= \int g(s, t, \theta) f_{S|T}(s|t, \phi) ds$$

where S and T are random variables, $\phi$ and $\theta$ are deterministic parameters, and g is integrable with respect to the conditional pdf $f_{S|T}$.

A standard EM algorithm may perform the following two steps iteratively on a vector $y=(y_1, \ldots, y_M)$ of observed random samples of Y:

| Algorithm 1 $\hat{\theta}_{EM}$ = EM-Estimate(y) |
|---|
| 1: E-Step: $Q(\theta|\theta_k) \leftarrow \mathbb{E}_{Z|y,\theta_k}[\ln f(y,Z|\theta)]$ |
| 2: M-Step: $\theta_{k+1} \leftarrow \operatorname{argmax}_\theta \{Q(\theta|\theta_k)\}$ |

The algorithm may stop when successive estimates differ by less than a given tolerance $\|\theta_k-\theta_{k-1}\|<10^{-tol}$ or when $\|l(\theta_k|y)-l(\theta_{k-1}|y)\|<\epsilon$. The EM algorithm may converge $(\theta_k \to \theta_*)$ to a local maximum $\theta_*$, see C. F. J. Wu, "On the Convergence Properties of the EM Algorithm," The Annals of Statistics 11 (1983) 95-103; R. A. Boyles, "*On the convergence of the EM algorithm*," Journal of the Royal Statistical Society. Series B (Methodological) 45 (1983) 47-50: $\theta_k \to \theta_*$.

The EM algorithm may be a family of MLE methods for working with incomplete data models. Such incomplete data models may include mixture models, see R. A. Redner and H. F. Walker, "*Mixture Densities, Maximum Likelihood and the EM algorithm*," SIAM Review 26 (1984) 195-239; L. Xu and M. I. Jordan, "*On convergence properties of the EM algorithm for gaussian mixtures*," Neural computation 8 (1996) 129-151, censored exponential family models, see R. Sundberg, "*Maximum likelihood theory for incomplete data from an exponential family*," Scandinavian Journal of Statistics (1974) 49-58, and mixtures of censored models, see D. Chauveau, "*A stochastic EM algorithm for mixtures with censored data*," Journal of Statistical Planning and Inference 46 (1995) 1-25. The next subsection describes examples of such incomplete data models.

Users may have a good deal of freedom when they specify the EM complete random variables X and latent random variables Z for probabilistic models on the observed data Y. This freedom in model selection may allow users to recast many disparate algorithms as EM algorithms, see R. J. Hathaway, "*Another interpretation of the EM algorithm for mixture distributions*," Statistics & Probability Letters 4 (1986) 53-56; J. P. Delmas, "*An equivalence of the EM and ICE algorithm for exponential family*," IEEE Transactions on Signal Processing 45 (1997) 2613-2615; M. Á. Carreira-Perpiñán, "*Gaussian mean shift is an EM algorithm*," IEEE Trans. on Pattern Analysis and Machine Intelligence 29 (2005) 2007; G. Celeux and G. Govaert, "*A Classification EM Algorithm for Clustering and Two Stochastic Versions*," Computational Statistics & Data Analysis 14 (1992) 315-332. Changes to the E and M steps give another degree of freedom for the EM scheme, see A. P. Dempster, N. M. Laird and D. B. Rubin, "*Maximum Likelihood from Incomplete Data via the EM Algorithm (with discussion)*," Journal of the Royal Statistical Society, Series B 39 (1977) 1-38; J. A. Fessler and A. O. Hero, "*Space-Alternating Generalized Expectation-Maximization Algorithm*," IEEE Transactions on Signal Processing 42

(1994) 2664-2677; H. M. Hudson and R. S. Larkin, "*Accelerated Image Reconstruction using Ordered Subsets of Projection Data*," IEEE Transactions on Medical Imaging 13 (1994) 601-609; X. L. Meng and D. B. Rubin, "*Using EM to obtain asymptotic variance-covariance matrices: the SEM algorithm*,", Journal of the American Statistical Association 86 (1991) 899-909; G. Celeux, S. Chrétien, F. Forbes and A. Mkhadri, "*A component-wise EM algorithm for mixtures*," Journal of Computational and Graphical Statistics 10 (2001) 697-712.

A. Incomplete Data Models for EM: Mixture and Censored Gamma Models

Now described is the finite mixture model, an example of an incomplete data model which may be used to compare the EM and the NEM algorithms:

A finite mixture model, see R. A. Redner and H. F. Walker, "*Mixture Densities, Maximum Likelihood and the EM algorithm*," SIAM Review 26 (1984) 195-239; G. J. McLachlan and D. Peel, Finite Mixture Models, Wiley series in probability and statistics: Applied probability and statistics (Wiley, 2004), may be a convex combination of a finite set of sub-populations. The sub-population pdfs may come from the same parametric family. Mixture models may be useful for modeling mixed populations for statistical applications such as clustering, pattern recognition, and acceptance testing. The following notation for mixture models are used. Y is the observed mixed random variable. K is the number of sub-populations. $Z \in \{1, \ldots, K\}$ is the hidden sub-population index random variable. The convex population mixing proportions $\alpha_1, \ldots, \alpha_K$ form a discrete pdf for Z: $P(Z=j)=\alpha_j$. The pdf $f(y|Z=j,\theta_j)$ is the pdf of the $j^{th}$ sub-population where $\theta_1, \ldots, \theta_K$ are the pdf parameters for each sub-population. $\Theta$ is the vector of all model parameters $\Theta=\{\alpha_1, \ldots, \alpha_K, \theta_1, \ldots, \theta_K\}$. The joint pdf $f(y,z|\Theta)$ is $$f(y, z \mid \Theta) = \sum_{j=1}^{K} \alpha_j f(y \mid j, \theta_j) \delta[z - j]. \tag{3}$$

The marginal pdf for Y and the conditional pdf for Z given y are $$f(y \mid \Theta) = \sum_j \alpha_j f(y \mid j, \theta_j) \tag{4}$$

and $$p_Z(j \mid y, \Theta) = \frac{\alpha_j f(y \mid Z = j, \theta_j)}{f(y \mid \Theta)} \tag{5}$$

by Bayes theorem. The joint pdf in exponential form for ease of analysis are rewritten $$f(y, z \mid \Theta) = \exp\left[\sum_j [\ln(\alpha_j) + \ln f(y \mid j, \theta_j)] \delta[z - j]\right]. \tag{6}$$

Thus $$\ln f(y, z \mid \Theta) = \sum_j \delta[z - j] \ln[\alpha_j f(y \mid j, \theta_j)]. \tag{7}$$

EM algorithms for finite mixture models may estimate $\Theta$ using the sub-population index Z as the latent variable. An EM algorithm on a finite mixture model may use (5) to derive the Q-function $$Q(\Theta \mid \Theta_k) = \mathbb{E}_{Z|y,\Theta_k}[\ln f(y, Z \mid \Theta)] \tag{8}$$

$$= \sum_z \left(\sum_j \delta[z - j] \ln[\alpha_j f(y \mid j, \theta_j)]\right) \times p_z(z \mid y, \Theta_k) \tag{9}$$

$$= \sum_j \ln[\alpha_j f(y \mid j, \theta_j)] p_Z(j \mid y, \Theta_k). \tag{10}$$

B Noise Benefits in the EM Algorithm

Figure 1:
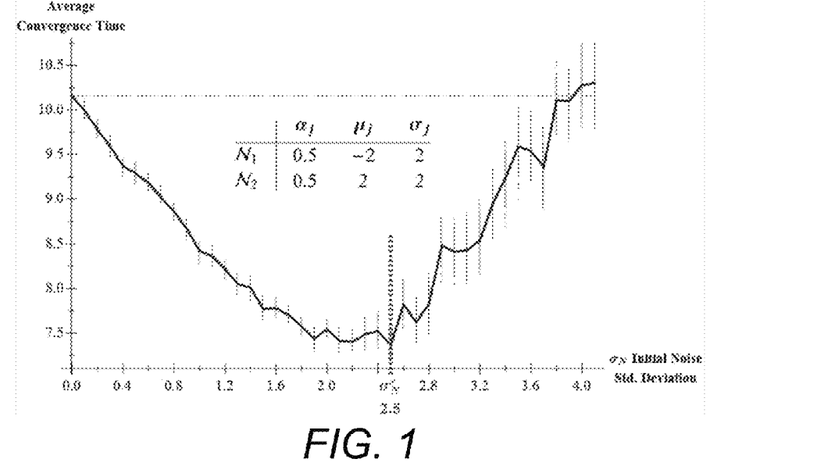
FIG. 1 illustrates an example of a possible EM noise benefit for a Gaussian mixture model.
Figure 2:
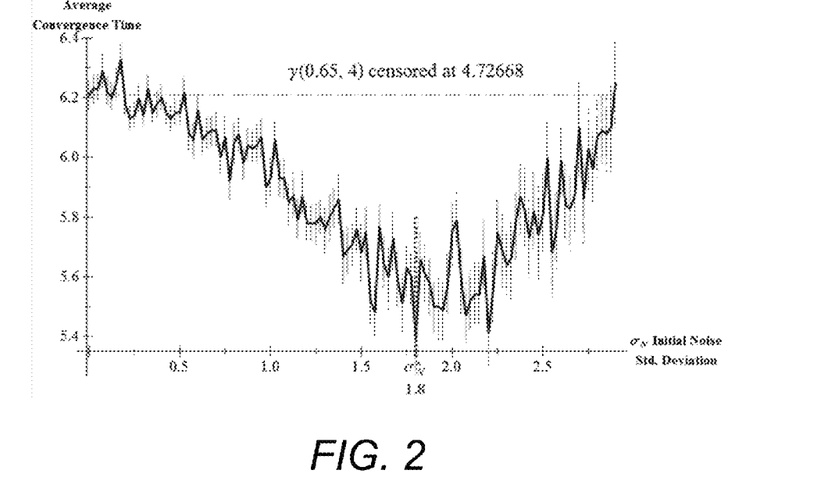
FIG. 2 illustrates an example of a possible EM noise benefit for a log-convex censored gamma model.

FIG. 1 illustrates an example of a possible EM noise benefit for a Gaussian mixture model. The plot used the noise-annealed NEM algorithm. Low intensity initial noise decreased convergence time while higher intensity starting noise increased it. The optimal initial noise level had standard deviation $\sigma_N^*=2.5$. The average optimal NEM speed-up over the noiseless EM algorithm is 27.2%. This NEM procedure added noise with a cooling schedule. The noise cools at an inverse-square rate. The Gaussian mixture density was a convex combination of two normal sub-populations $N_1$ and $N_2$. The simulation used 200 samples of the mixture normal distribution to estimate the standard deviations of the two sub-populations. The additive noise used samples of zero-mean normal noise with standard deviation $\sigma_N$ screened through the GMM-NEM condition in (42). Each sampled point on the curve is the average of 100 trials. The vertical bars are 95% bootstrap confidence intervals for the mean convergence time at each noise level.

Theorem 1 below states a general sufficient condition for a noise benefit in the average convergence time of the EM algorithm. FIG. 1 shows a simulation instance of this theorem for the important EM case of Gaussian mixture densities. Small values of the noise variance may reduce convergence time while larger values may increase it. This possible U-shaped noise benefit may be the non-monotonic signature of stochastic resonance. The optimal noise speeds may converge by 27.2%. Other simulations on multidimensional GMMs have shown speed increases of up to 40%.

The possible EM noise benefit may differ from almost all stochastic resonance (SR) noise benefits because it may not involve the use of a signal threshold, see L. Gammaitoni, P. Hänggi, P. Jung and F. Marchesoni, "*Stochastic Resonance*," Reviews of Modern Physics 70 (1998) 223-287. The possible EM noise benefit may also differ from most SR noise benefits because the additive noise can depend on the signal. Independent noise can lead to weaker noise benefits than dependent noise in EM algorithms. This may also happen with enhanced convergence in noise-injected Markov chains, see B. Franzke and B. Kosko, "*Noise can speed convergence in Markov chains*,", Physical Review E 84 (2011) 041112.

The idea behind the EM noise benefit is that sometimes noise can make the signal data more probable. This occurs at the local level when $$f(y+n|\theta) > f(y|\theta) \tag{14}$$

for probability density function (pdf) $f$, realization y of random variable Y, realization n of random noise N, and parameter $\theta$. This condition holds if and only if the logarithm of the pdf ratio is positive:

$$\ln\left(\frac{f(y+n \mid \theta)}{f(y \mid \theta)}\right) > 0. \tag{15}$$

The logarithmic condition (15) in turn occurs much more generally if it holds only on average with respect to all the pdfs involved in the EM algorithm:

$$\mathbb{E}_{Y,Z,N|\theta_*}\left[\ln\frac{f(Y+N,Z|\theta_k)}{f(Y,Z|\theta_k)}\right] \geq 0 \quad (16)$$

where random variable Z represents missing data in the EM algorithm and where $\theta_*$ is the limit of the EM estimates $\theta_k$: $\theta_k \to \theta_*$. The positivity condition (16) may be precisely the sufficient condition for a noise benefit in Theorem 1 below, called the NEM or Noisy EM Theorem.

III. Noisy Expectation Maximization Theorems

The EM noise benefit may be defined by first defining a modified surrogate log-likelihood function $$Q_N(\theta|\theta_k) = \mathbb{E}_{Z|y,\theta_k}[\ln f(y+N,Z|\theta)] \quad (17)$$

and its maximizer $$\theta_{k+1,N} = \underset{\theta}{\operatorname{argmax}}\{Q_N(\theta|\theta_k)\}.$$

The modified surrogate log-likelihood $Q_N(\theta|\theta_k)$ equals the regular surrogate log-likelihood $Q(\theta|\theta_k)$ when N=0. $Q(\theta|\theta_*)$ is the final surrogate log-likelihood given the optimal EM estimate $\theta_*$. So $\theta_*$ may maximize $Q(\theta|\theta_*)$. Thus $$Q(\theta_*|\theta_*) \geq Q(\theta|\theta_*) \text{ for all } \theta. \quad (18)$$

An EM noise benefit occurs when the noisy surrogate log-likelihood $Q_N(\theta_k|\theta_*)$ is closer to the optimal value $Q(\theta_*|\theta_*)$ than the regular surrogate log-likelihood $Q(\theta_k|\theta_*)$ is. This holds when $$Q_N(\theta_k|\theta_*) \geq Q(\theta_k|\theta_*) \quad (19)$$

or $$(Q(\theta_*|\theta_*) - Q(\theta_k|\theta_*)) \geq (Q(\theta_*|\theta_*) - Q_N(\theta_k|\theta_*)). \quad (20)$$

So the noisy perturbation $Q_N(\theta|\theta_k)$ of the current surrogate log-likelihood $Q(\theta|\theta_k)$ may be a better log-likelihood function for the data than Q is itself. An average noise benefit results when the expectations of both sides of inequality (20):

$$\mathbb{E}_N[Q(\theta_*|\theta_*) - Q(\theta_k|\theta_*)] \geq \mathbb{E}_N[Q(\theta_*|\theta_*) - Q_N(\theta_k|\theta_*)]. \quad (21)$$

are taken.

The average noise benefit (21) occurs when the final EM pdf $f(y,z|\theta_*)$ is closer in relative-entropy to the noisy pdf $f(y+N, z|\theta_k)$ than it is to the noiseless pdf $f(y,z|\theta_k)$. Define the relative-entropy pseudo-distances $$c_k(N) = D(f(y,z|\theta_*)\|f(y+N,z|\theta_k)) \quad (22)$$

$$c_k = c_k(0) = D(f(y,z|\theta_*)\|f(y,z|\theta_k)). \quad (23)$$

Then noise benefits the EM algorithm when $$c_k \geq c_k(N) \quad (24)$$

holds for the relative-entropy pseudo-distances. The relative entropy itself has the form, see T. M. Cover and J. A. Thomas, Elements of Information Theory (Wiley & Sons, New York, 1991), 1 edition, $$D(h(u,v)\|g(u,v)) = \int_{U,V} \ln\left[\frac{h(u,v)}{g(u,v)}\right] h(u,v) du dv \quad (25)$$

for positive pdfs h and g over the same support. Convergent sums can replace the integrals as needed.

A. NEM Theorem

The Noisy Expectation Maximization (NEM) Theorem below uses the following notation. The noise random variable N has pdf $f(n|y)$. So the noise N can depend on the data Y. Independence implies that the noise pdf becomes $f(n|y)=f_N(n)$. $\{\theta_k\}$ is a sequence of EM estimates for $\theta$. $\theta_* = \lim_{k\to\infty} \theta_k$ is the converged EM estimate for $\theta$. Assume that the differential entropy of all random variables is finite. Assume also that the additive noise keeps the data in the likelihood function's support. The Appendix below gives proof of the NEM Theorem and its three corollaries.

Theorem 1: Noisy Expectation Maximization (NEM). The EM estimation iteration noise benefit $$(Q(\theta_*|\theta_*) - Q(\theta_k|\theta_*)) \geq (Q(\theta_*|\theta_*) - Q_N(\theta_k|\theta_*)) \quad (26)$$

may occur on average if $$\mathbb{E}_{Y,Z,N|\theta_*}\left[\ln\left(\frac{f(Y+N,Z|\theta_k)}{f(Y,Z|\theta_k)}\right)\right] \geq 0. \quad (27)$$

The NEM theorem also applies to EM algorithms that use the complete data as their latent random variable. The proof for these cases follows from the proof in the appendix. The NEM positivity condition in these models may changes to $$\mathbb{E}_{X,Y,N|\theta_*}\left[\ln\left(\frac{f(X+N|\theta_k)}{f(X|\theta_k)}\right)\right] \geq 0. \quad (28)$$

The theorem also holds for more general methods of noise injection like using noise multiplication y.N instead of noise addition y+N. The NEM condition for generalized noise injection is $$\mathbb{E}_{Y,Z,N|\theta_*}\left[\ln\left(\frac{f(\phi(Y,N),Z|\theta_k)}{f(Y,Z|\theta_k)}\right)\right] \geq 0$$

where $\phi(Y,N)$ is some generalized function for combining data with noise.

The NEM Theorem may imply that each iteration of a suitably noisy EM algorithm moves closer on average towards the EM estimate $\theta_*$ than does the corresponding noiseless EM algorithm, see O. Osoba, S. Mitaim and B. Kosko, "Noise Benefits in the Expectation-Maximization Algorithm: NEM Theorems and Models," in The International Joint Conference on Neural Networks (IJCNN) (IEEE, 2011), pp. 3178-3183. This may hold because the positivity condition (27) implies that $\mathbb{E}_N[c_k(N)] \leq c_k$ at each step k since $c_k$ does not depend on N from (23). The NEM algorithm may use larger overall steps on average than does the noiseless EM algorithm for any number k of steps The NEM theorem's stepwise possible noise benefit may lead to a noise benefit at any point in the sequence of NEM estimates. This is because the following inequalities may be had when the expected value of inequality (19) takes the form $$Q(\theta_k|\theta_*) \leq \mathbb{E}_N[Q_N(\theta_k|\theta_*)] \text{ for any k.} \tag{29}$$

Thus $$Q(\theta_*|\theta_*) - Q(\theta_k|\theta_*) \geq Q(\theta_*|\theta_*) - \mathbb{E}_N[Q_N(\theta_k|\theta_*)] \text{ for any k.} \tag{30}$$

The EM (NEM) sequence may converge when the left (right) side of inequality (30) equals zero. Inequality (30) implies that the difference on the right side is closer to zero at any step k.

NEM sequence convergence may be even stronger if the noise $N_k$ decays to zero as the iteration count k grows to infinity. This noise annealing implies $N_k \to 0$ with probability one. Continuity of Q as a function of Y implies that $Q_{N_k}(\theta|\theta_k) \to Q(\theta|\theta_k)$ as $N_k \to 0$. This may hold because $Q(\theta|\theta_k) = \mathbb{E}_{Z|y,\theta_k}[\ln f(y,Z|\theta)]$ and because the continuity of Q implies that $$\lim_{N \to 0} Q_N(\theta \mid \theta_k) = \tag{31}$$

$$\mathbb{E}_{Z|y,\theta_k}\left[\ln\left(\lim_{N \to 0}(y+N), Z \mid \theta\right)\right] = \mathbb{E}_{Z|y,\theta_k}[\ln f(y, Z \mid \theta)] = Q(\theta \mid \theta_k).$$

The evolution of EM algorithms may guarantee that $\lim_k Q(\theta_k|\theta_*) = Q(\theta_*|\theta_*)$. This may give the probability-one limit $$\lim_{k \to \infty} Q_{N_k}(\theta_k \mid \theta_*) = Q(\theta_* \mid \theta_*). \tag{32}$$

So for any $\epsilon > 0$ there may exist a $k_0$ such that for all $k > k_0$:

$$|Q(\theta_k|\theta_*) - Q(\theta_*|\theta_*)| < \epsilon \text{ and } |Q_{N_k}(\theta_k|\theta_*) - Q(\theta_*|\theta_*)| < \epsilon \text{ with probability one.} \tag{33}$$

Inequalities (29) and (33) may imply that $Q(\theta_k|\theta_*)$ is $\epsilon$-close to its upper limit $Q(\theta_*|\theta_*)$ and $$\mathbb{E}[Q_{N_k}(\theta_k|\theta_*)] \geq Q(\theta_k|\theta_*) \text{ and } Q(\theta_*|\theta_*) \geq Q(\theta_k|\theta_*) \tag{34}$$

So the NEM and EM algorithms may converge to the same fixed-point by (32). And the inequalities (34) may imply that NEM estimates are closer on average to optimal than EM estimates are at any step k.

B. NEM: Dominated Densities and Mixture Densities

The first corollary of Theorem 1 gives a dominated-density condition that satisfies the positivity condition (27) in the NEM Theorem. This strong pointwise condition is a direct extension of the pdf inequality in (14) to the case of an included latent random variable Z.

Corollary 1:

$$\mathbb{E}_{Y,Z,N|\theta_*}\left[\ln\frac{f(Y+N, Z \mid \theta)}{f(Y, Z \mid \theta)}\right] \geq 0 \tag{35}$$

if $$f(y+n, z \mid \theta) \geq f(y, z \mid \theta)$$

for almost all y, z, and n.

The Corollary 1 may be used to derive conditions on the noise N that produce NEM noise benefits for mixture models. NEM mixture models may use two special cases of Corollary 1. These special cases as Corollaries 2 and 3 are stated below. The corollaries use the finite mixture model notation in Section 2.1. Recall that the joint pdf of Y and Z is $$f(y,z|\theta) = \Sigma_j \alpha_j f(y|j,\theta) \delta[z-j]. \tag{36}$$

Define the population-wise noise likelihood difference as $$\Delta f_j(y,n) = f(y+n|j,\theta) - f(y|j,\theta). \tag{37}$$

Corollary 1 implies that noise benefits the mixture model estimation if the dominated-density condition holds:

$$f(y+n,z|\theta) \geq f(y,z|\theta). \tag{38}$$

This may occur if $$\Delta f_j(y,n) \geq 0 \text{ for all j}. \tag{39}$$

The Gaussian mixture model (GMM) may use normal pdfs for the sub-population pdfs, see V. Hasselblad, "*Estimation of Parameters for a Mixture of Normal Distributions*," Technometrics 8 (1966) 431-444; R. A. Redner and H. F. Walker, "*Mixture Densities, Maximum Likelihood and the EM algorithm*," SIAM Review 26 (1984) 195-239. Corollary 2 states a simple quadratic condition that may ensure that the noisy sub-population pdf $f(y+n|Z=j,\theta)$ dominates the noiseless sub-population pdf $f(y|Z=j,\theta)$ for GMMs. The additive noise samples n may depend on the data samples y.

Corollary 2: Suppose $Y|_{Z=j} \sim N(\mu_j, \sigma_j^2)$ and thus $f(y|j,\theta)$ is a normal pdf. Then $$\Delta f_j(y,n) \geq 0 \tag{40}$$

holds if $$n^2 \leq 2n(\mu_j - y). \tag{41}$$

Now apply the quadratic condition (41) to (39). Then $f(y+n,z|\theta) \geq f(y,z|\theta)$ may hold when $$n^2 \leq 2n(\mu_j - y) \text{ for all j}. \tag{42}$$

The inequality (42) gives the GMM-NEM noise benefit condition (misstated in O. Osoba and B. Kosko, "*Noise-Enhanced Clustering and Competitive Learning Algorithms*," Neural Networks 37 (2013) 132-140, but corrected in O. Osoba and B. Kosko, "*Corrigendum to 'Noise enhanced clustering and competitive learning algorithms' [Neural Netw. 37 (2013) 132-140]*," Neural Networks (2013)) when the NEM system more quickly estimates the standard deviations $\sigma_j$ than does noiseless EM. This can also benefit expectation-conditional-maximization (ECM), see X. L. Meng and D. B. Rubin, "*Maximum Likelihood Estimation via the ECM algorithm: A general framework*," Biometrika 80 (1993) 267, methods.

FIG. 1 shows an example of a simulation instance of possible noise benefits for GMM parameter estimation based on the GMM-NEM condition (42). The simulation estimates the sub-population standard deviations $\sigma_1$ and $\sigma_2$ from 200 samples of a Gaussian mixture of two 1-D sub-populations with known means $\mu_1 = -2$ and $\mu_2 = 2$ and mixing proportions $\alpha_1 = 0.5$ and $\alpha_2 = 0.5$. The true standard deviations may be $\sigma_1^* = 2$ and $\sigma_2^* = 2$. Each EM and NEM procedure may start at the same initial point with $\sigma_1(0) = 4.5$ and $\sigma_2(0) = 5$. The simulation runs NEM on 100 GMM data sets for each noise level $\sigma_N$ and counts the number of iterations before convergence for each instance. The average of these iteration counts is the average convergence time at that noise level $\sigma_N$. The EM and NEM simulations use the NArgMax numerical maximization routine in Mathematica for the M-step. Simulations (not shown) also confirm that both the Cauchy mixture model (CMM) and non-Gaussian noise may show a similar pronounced noise benefit.

Corollary 3 gives a similar quadratic condition for the Cauchy mixture model.

Corollary 3: Suppose $Y|_{Z=j} \sim C(m_j, d_j)$ and thus $f(y|j,\theta)$ is a Cauchy pdf. Then $$\Delta f_j(y,n) \geq 0 \quad (43)$$

holds if $$n^2 \leq 2n(m_j - y). \quad (44)$$

Again apply the quadratic condition (44) to (39). Then $f(y+n, z|\theta) \geq f(y, z|\theta)$ may hold when $$n^2 \leq 2n(m_j - y) \text{ for all } j. \quad (45)$$

Both quadratic NEM inequality conditions in (42) and (45) may reduce to the following inequality (replace μ with m for the CMM case):

$$n[n - 2(\mu_j - y)] \leq 0 \text{ for all } j. \quad (46)$$

So the noise n may fall in the set where the parabola $n^2 - 2n(\mu_j - y)$ is negative for all j. There are two possible solution sets for (46) depending on the values of $\mu_j$ and y. These solution sets are $$N^-_j(y) = [2(\mu_j - y), 0] \quad (47)$$

$$N^+_j(y) = [0, 2(\mu_j - y)]. \quad (48)$$

A goal may be to find the set N(y) of n values that satisfy the inequality in (42) for all j:

$$N(y) = \cap_j N_j(y) \quad (49)$$

where $N_j(y) = N^+_j(y)$ or $N_j(y) = N^-_j(y)$. $N(y) \neq \{0\}$ may hold only when the sample y lies on one side of all subpopulation means (or location parameters) $\mu_j$. This may hold for $$y < \mu_j \text{ for all } j \text{ or } y < \mu_j \text{ for all } j. \quad (50)$$

The NEM noise N may take values in $\cap_j N^-_j$ if the data sample y falls to the right of all sub-population means ($y > \mu_j$ for all j). The NEM noise N may take values in $\cap_j N^+_j$ if the data sample y falls to the left of all subpopulation means ($y < \mu_j$ for all j). And N=0 may only be valid value for N when y falls between sub-populations means. Thus, the noise N may tend to pull the data sample y away from the tails and towards the cluster of sub-population means (or locations).

IV. The Noisy Expectation-Maximization Algorithm

The NEM Theorem and its corollaries give a general method for modifying the noiseless EM algorithm. The NEM Theorem also may imply that, on average, these NEM variants outperform the noiseless EM algorithm.

Algorithm 2 gives the Noisy Expectation-Maximization algorithm schema. The operation NEMNoiseSample(y) generates noise samples that satisfy the NEM condition for the current data model. The noise sampling distribution may depend on the vector of random samples y in the Gaussian and Cauchy mixture models. The noise can have any value in the NEM algorithm for censored gamma models. The E-Step may take a conditional expectation of a function of the noisy data samples $y_\dagger$ given the noiseless data samples y.

---

Algorithm 2 $\hat{\theta}_{NEM}$ = NEM-Estimate(y)

Require: $y = (y_1, \ldots, y_M)$: vector of observed incomplete data
Ensure: $\hat{\theta}_{NEM}$: NEM estimate of parameter θ
1:     while $(\|\theta_k - \theta_{k-1}\| \geq 10^{-tol})$ do
2:         $N_S$-Step: $n \leftarrow k^{-\tau} \times$ NEMNoiseSample(y)
3:         $N_A$-Step: $y_\dagger \leftarrow y + n$
4:         E-Step: $Q(\theta|\theta_k) \leftarrow E_{Z|y,\theta_k}[\ln f(y_\dagger, Z|\theta)]$
5:         M-Step: $\theta_{k+1} \leftarrow \underset{\theta}{\operatorname{argmax}} \{Q(\theta|\theta_k)\}$
6:         $k \leftarrow k + 1$
7:     end while
8:     $\hat{\theta}_{NEM} \leftarrow \theta_k$

---

A deterministic decay factor $k^{-\tau}$ scales the noise on the $k^{th}$ iteration. τ is the noise decay rate. The decay factor $k^{-\tau}$ reduces the noise at each new iteration. This factor drives the noise $N_k$ to zero as the iteration step k increases. The simulations in this presentation use τ=2 for demonstration. Values between τ=1 and τ=3 also work. $N_k$ still needs to satisfy the NEM condition for the data model. The cooling factor $k^{-\tau}$ must not cause the noise samples to violate the NEM condition. This may means that $0 < k^{-\tau} \leq 1$ and that the NEM condition solution set is closed with respect to contractions.

The decay factor may reduce the NEM estimator's jitter around its final value. This may be important because the EM algorithm converges to fixed-points. So excessive estimator jitter may prolong convergence time even when the jitter occurs near the final solution. The simulations in this presentation use polynomial decay factors instead of logarithmic cooling schedules found in annealing applications, see S. Kirkpatrick, C. Gelatt Jr and M. Vecchi, "*Optimization by simulated annealing*," Science 220 (1983) 671-680; V. Cerny, "*Thermodynamical approach to the Traveling Salesman Problem: An efficient simulation algorithm*," Journal of Optimization Theory and Applications 45 (1985) 41-51; S. Geman and C. Hwang, "*Diffusions for global optimization*," SIAM Journal on Control and Optimization 24 (1986) 1031-1043; B. Hajek, "*Cooling schedules for optimal annealing*," Mathematics of operations research (1988) 311-329; B. Kosko, Neural Networks and Fuzzy Systems: A Dynamical Systems Approach to Machine Intelligence (Prentice Hall, 1991).

Deterministic and/or chaotic samples can achieve effects similar to random noise in the NEM algorithm. NEM variants that use deterministic or chaotic perturbations instead of random noise may be called Deterministic Interference EM or Chaotic EM respectively.

The next algorithm is an example of the full NEM algorithm for 1-D GMMs using an inverse square cooling rate on the additive noise. The N-step combines both $N_S$ and $N_A$ steps in the NEM algorithm.

---

Algorithm 3 GMM-NEM Algorithm (1-D)

Require: $y = (y_1, \ldots, y_M)$: vector of observed incomplete data
Ensure: $\hat{\theta}_{NEM}$: NEM estimate of parameter θ
1:     while $(\|\theta_k - \theta_{k-1}\| \geq 10^{-tol})$ do -continued Algorithm 3 GMM-NEM Algorithm (1-D)

2:     N-Step: $y_{\dagger,i} = y_i + n_i$ where $n_i$ is a sample of the truncated Gaussian $\sim N\left(0, \frac{\sigma N}{k^2}\right)$       such that $n_i[n_i - 2(\mu_j - y_i)] \leq 0$ for all $i, j$ 3:     E-Step: $Q(\Theta|\Theta(t)) = \Sigma_{i=1}^{M} \Sigma_{j=1}^{K} \ln[\alpha_j \int (z_i|j, \theta_j)] p_Z(j|y, \Theta(t))$ 4:     M-Step: $\theta_{k+1} = \arg\max_\theta \{Q(\theta|\theta_k)\}$ 5:     $k = k + 1$
6:     end while
7:     $\hat{\theta}_{NEM} = \theta_k$.

The NEM algorithm may inherit variants from the classical EM algorithm schema. A NEM adaptation to the Generalized Expectation Maximization (GEM) algorithm may be one of the simpler variations. The GEM algorithm replaces the EM maximization step with a gradient ascent step. The Noisy Generalized Expectation Maximization (NGEM) algorithm (Algorithm 3) may use the same M-step:

Algorithm 3 Modified M-Step for NGEM:

1: M-Step: $\theta_{k+1} \leftarrow \tilde{\theta}$ such that $Q(\tilde{\theta}|\theta_k) \geq Q(\theta_k|\theta_k)$ The NEM algorithm schema may also allow for some variations outside the scope of the EM algorithm. These involve modifications to the noise sampling step $N_S$-Step or to the noise addition step $N_A$-Step. One such modification may not require an additive noise term $n_i$ for each $y_i$. This may be useful when the NEM condition is stringent because then noise sampling can be time intensive. This variant changes the $N_S$-Step by picking a random or deterministic sub-selection of y to modify. Then, it samples the noise subject to the NEM condition for those sub-selected samples. This is the Partial Noise Addition NEM (PNA-NEM).

Algorithm 4 Modified $N_s$-Step or PNA-NEM

$\mathcal{I} \leftarrow \{1 \ldots M\}$
    $\mathcal{J} \leftarrow$ SubSelection($\mathcal{I}$)
    for all $i \in \mathcal{J}$ do
      $n_i \leftarrow k^{-T} \times$ NEMNoiseSample($y_i$)
    end for The NEM noise generating procedure NEMNoiseSample (y) may return a NEMcompliant noise sample n at a given noise level $\sigma_N$ for each data sample y. This procedure may change with the EM data model. The noise generating procedure for the GMMs and CMMs comes from Corollaries 2 and 3. The following 1-D noise generating procedure may be used for the GMM simulations:

NEMNoiseSample for GMM- and CMM-NEM

Require: y and $\sigma_N$: current data sample and noise level
Ensure: n: noise sample satisfying NEM condition
    $N(y) \leftarrow \cap_j N_j(y)$
    n is a sample from the distribution $TN(0, \sigma_N|N(y))$ where $TN(0, \sigma_N|N(y))$ is the normal distribution $N(0, \sigma_N)$ truncated to the support set $N(y)$. The set $N(y)$ is the interval intersection from (49). Multi-dimensional versions of the generator can apply the procedure component-wise.

V. NEM Sample Size Effects: Gaussian and Cauchy Mixture Models

The noise-benefit effect may depend on the size of the GMM data set. Analysis of this effect may depend on the probabilistic event that the noise satisfies the GMM-NEM condition for the entire sample set. This analysis also applies to the Cauchy mixture model because its NEM condition is the same as the GMM's. Define $A_k$ as the event that the noise N satisfies the GMM-NEM condition for the $k^{th}$ data sample:

$$A_k = \{N^2 \leq 2N(\mu_j - y_k) | \forall j\}. \tag{52}$$

Then define the event $A_M$ that noise random variable N satisfies the GMM-NEM condition for each data sample as $$A_M = \bigcap_k^M A_k \tag{53}$$

$$= \{N^2 \leq 2N(\mu_j - y_k) | \forall j \text{ and } \forall k\}. \tag{54}$$

This construction may be useful for analyzing NEM when the independent and identically distributed (i.i.d.) noise $$N_k \stackrel{d}{=} N$$

for all $y_k$ is used while still enforcing the NEM condition.

A Large Sample Size Effects

The next theorem shows that the set $A_M$ shrinks to the singleton set $\{0\}$ as the number M of samples in the data set grows. So the probability of satisfying the NEM condition with i.i.d. noise samples goes to zero as $M \to \infty$ with probability one.

Theorem 2: Large Sample GMM and CMM-NEM

Assume that the noise random variables are i.i.d. Then the set of noise values $$A_M = \{N^2 \leq 2N(\mu_j - y_k) | \forall j \text{ and } \forall k\} \tag{55}$$

that satisfy the Gaussian NEM condition for all data samples $y_k$ decreases with probability one to the set $\{0\}$ as $M \to \infty$:

$$P\left(\lim_{M \to \infty} A_M = \{0\}\right) = 1. \tag{56}$$

The proof shows that larger sample sizes M may place tighter bounds on the size of $A_M$ with probability one. The bounds shrink $A_M$ all the way down to the singleton set $\{0\}$ as $M \to \infty$. $A_M$ is the set of values that identically distributed noise N can take to satisfy the NEM condition for all $y_k$. $A_M = \{0\}$ means that $N_k$ must be zero for all k because the $N_k$ are identically distributed. This corresponds to cases where the NEM Theorem cannot guarantee improvement over the regular EM using just i.i.d. noise. So identically distributed noise may have limited use in the GMM- and CMM-NEM framework.

Theorem 2 is a "probability-one" result. But it also implies the following convergence-in-probability result. Suppose $\tilde{N}$ is an arbitrary continuous random variable. Then the probability $P(\tilde{N} \in A_M)$ that $\tilde{N}$ satisfies the NEM condition for all samples may fall to $P(\tilde{N} \in \{0\}) = 0$ as $M \to \infty$.

Using non-identically distributed noise $N_k$ may avoid the reduction in the probability of satisfying the NEM-condition for large M. The NEM condition may still hold when $N_k \in A_k$ for each k even if $N_k \notin A_M = \cap_k A_k$. This noise sampling model may adapt the $k^{th}$ noise random variable $N_k$ to the $k^{th}$ data sample $y_k$. This is the general NEM noise model. FIG. 1 and FIG. 2 use the NEM noise model. This model may be equivalent to defining the global NEM event $\tilde{A}_M$ as a Cartesian product of sub-events $\tilde{A}_M = \Pi_k^M A_k$ instead of the intersection of sub-events $A_M = \cap_k A_k$. Thus, the bounds of $\tilde{A}_M$ and its coordinate projections may no longer depend on sample size M.

Figure 3:
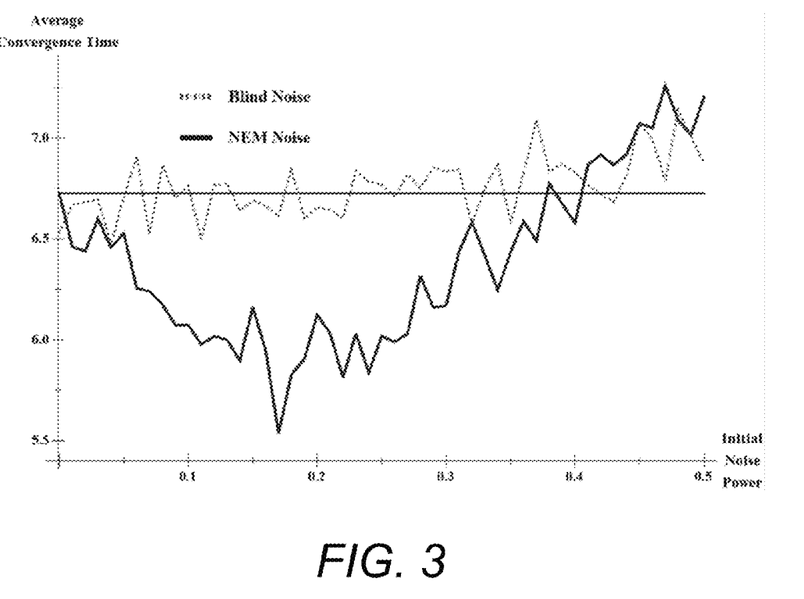
FIG. 3 illustrates an example of comparing the possible effects of noise injection with and without the NEM sufficient condition.

FIG. 3 illustrates an example of comparing of the possible effects of noise injection with and without the NEM sufficient condition. The data model is a GMM with sample size M=225. The blind noise model added annealed noise without checking the NEM condition. The plot shows that NEM noise injection outperformed the blind noise injection. NEM converged up to about 20% faster than the blind noise injection for this model. And blind noise injection produced no reduction in average convergence time. The Gaussian mixture density had mean $\mu=[0,1]$, standard deviations $\sigma=[1,1]$, and weights $\alpha=[0.5,0.5]$ with M=225 samples.

FIG. 3 compares the performance of the NEM algorithm with a simulated annealing version of the EM algorithm. This version of EM adds annealed i.i.d. noise to data samples y without screening the noise through the NEM condition, called blind noise injection. FIG. 3 shows that NEM may outperform blind noise injection at a single sample size M=225. But it also shows that blind noise injection may fail to give any benefit even when NEM achieves faster average EM convergence for the same set of samples. Thus blind noise injection (or simple simulated annealing) may perform worse than NEM and may sometimes performs worse than EM itself.

B. Small Sample Size: Sparsity Effect

The i.i.d noise model in Theorem 2 has an important corollary effect for sparse data sets. The size of $A_M$ decreases monotonically with M because $A_M = \cap_k^M A_k$. Then for $M_0 < M_1$:

$$P(N \in A_{M_0}) \geq P(N \in A_{M_1}) \quad (57)$$

since $M_0 < M_1$ implies that $A_{M_1} \subset A_{M_0}$. Thus arbitrary noise N (i.i.d and independent of $Y_k$) is more likely to satisfy the NEM condition and produce a noise benefit for smaller samples sizes $M_0$ than for larger samples sizes $M_1$. The probability that $N \in A_M$ falls to zero as $M \to \infty$. So the strength of the i.i.d. noise benefit falls as $M \to \infty$.

Possible Hardware

Figure 4:
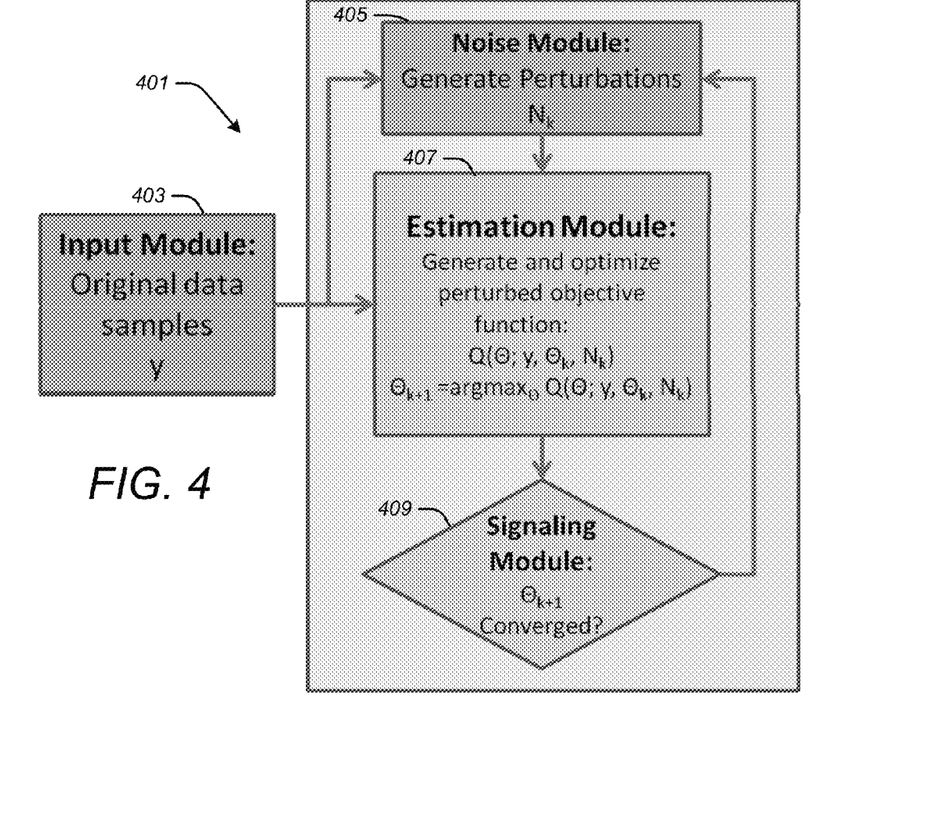
FIG. 4 illustrates an example of a computer estimation system for iteratively estimating an unknown parameter of a model or state of a system.

FIG. 4 illustrates an example of a computer estimation system 401 for iteratively estimating an unknown parameter of a model or state of a system. The estimating computer system 401 may include an input module 403, a noise module 405, and estimation module 407, and a signaling module 409. The computer estimated system 401 may include additional modules and/or not all of these modules. Collectively, the various modules may be configured to implement any or all of the algorithms that have been discussed herein. Now set forth are examples of these implementations.

The input module 403 may have a configuration that receives numerical data about a model or state of the system. The input module 403 may consist of or include a network interface card, a data storage system interface, any other type of device that receives data, and/or any combination of these.

The noise module 405 may have a configuration that generates random, chaotic, or other type of numerical perturbations of the received numerical data and/or that generates pseudo-random noise.

The noise module 405 may have a configuration that generates random, chaotic, or other type of numerical perturbations of the input numerical data that fully or partially satisfy a noisy expectation maximization (NEM) condition.

The noise module 405 may have a configuration that generates numerical perturbations that do not depend on the received numerical data.

The estimation module 407 may have a configuration that iteratively estimates the unknown parameter of the model or state of the system based on the received numerical data and then uses the numerical perturbations in the input numerical data and/or the pseudo-random noise and the input numerical data during at least one of the iterative estimates of the unknown parameter.

The estimation module 407 may have a configuration that estimates the unknown parameter of the model or state of the system using maximum likelihood, expectation-maximization, minorization-maximization, or another statistical optimization or sub-optimization method.

The estimation module 407 may have a configuration that estimates the unknown parameter of the model or state of the system by adding, multiplying, or otherwise combining the input data with the numerical perturbations.

The estimation module 407 may have a configuration that estimates the unknown parameter of the model or state of the system using the numerical perturbations that do not depend on the received numerical data.

The estimation module 407 may have a configuration that causes the magnitude of the generated numerical perturbations to eventually decay during successive parameter estimates.

Figure 5:
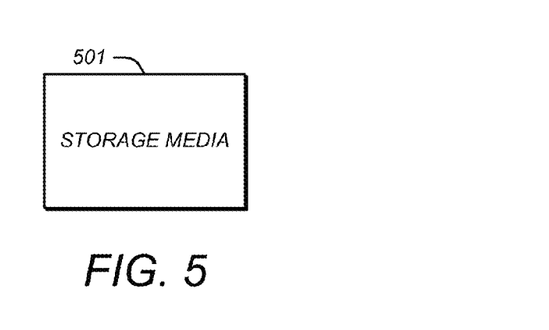
FIG. 5 illustrates an example of computer-readable storage media that may contain a program of instructions that causes a computer system running the program of instructions to function as any of the types of estimating computer system described herein.

FIG. 5 illustrates an example of computer-readable storage media that may contain a program of instructions that cause a computer system running the program of instructions to function as any of the types of estimating computer system described herein.

Other documents that disclose details about the technology that has been described herein include:

O. Osoba, S. Mitaim, B. Kosko, "The Noisy Expectation Maximization Algorithm," *Fluctuation and Noise Letters*, June 2013

K. Audhkhasi, O. Osoba, and B. Kosko, "Noise Benefits in Back-Propagation and Deep Bidirectional Pre-Training," *International Joint Conference on Neural Networks (IJCNN)*, 2013

K. Audhkhasi, O. Osoba, and B. Kosko, "Noisy Hidden Markov Models for Speech Recognition," *International Joint Conference on Neural Networks* (IJCNN), 2013

O. Osoba, B. Kosko, "Noise-enhanced Clustering and Competitive Learning Algorithms," *Neural Networks*, vol. 37, pp. 132-140, January 2013

O. Osoba, S. Mitaim, B. Kosko, "Noise Benefits in the Expectation-Maximization Algorithm: NEM Theorems and Models," *International Joint Conference on Neural Networks* (IJCNN), pp. 3178-3183, August 2011

Osoba, Osonde Adekorede. *Noise Benefits in Expectation-Maximization Algorithms*. Dissertation, University of Southern California, August 2013

VI. Conclusion

Careful noise injection can speed up the average convergence time of the EM algorithm. The various sufficient conditions for such a noise benefit may involve a direct or average effect where the noise makes the signal data more probable. Special cases may include mixture density models and log-convex probability density models. Noise injection for the Gaussian and Cauchy mixture models may improve the average EM convergence speed when the noise satisfies a simple quadratic condition. Even blind noise injection can sometimes benefit these systems when the data set is sparse. But NEM noise injection still outperforms blind noise injection in all data models tested.

APPENDIX

Proof of Theorems

Theorem 1: Noisy Expectation Maximization (NEM)
An EM estimation iteration noise benefit $$(Q(\theta_*|\theta_*) - Q(\theta_k|\theta_*)) \geq (Q(\theta_*|\theta_*) - Q_N(\theta_k|\theta_*)) \quad (67)$$

occurs on average if $$\mathbb{E}_{Y,Z,N|\theta_*}\left[\ln\left(\frac{f(Y+N, Z|\theta_k)}{f(Y, Z|\theta_k)}\right)\right] \geq 0. \quad (68)$$

Proof: Each expectation of Q-function differences in (21) is a distance pseudo-metric. Rewrite Q as an integral:

$$\int_Z \ln[f(y,z|\theta)]f(z|y,\theta_k)dz. \quad (69)$$

$c_k = D(f(y,z|\theta_*)\|f(y,z|\theta_k))$ is the expectation over Y because $$c_k = \int\int [\ln(f(y, z|\theta_*)) - \ln f(y, z|\theta_k)] \quad (70)$$
$$f(y, z|\theta_*)dzdy$$

$$= \int\int [\ln(f(y, z|\theta_*)) - \ln f(y, z|\theta_k)] \quad (71)$$
$$f(z|y, \theta_*)f(y|\theta_*)dzdy$$

$$= \mathbb{E}_{Y|\theta_k}[Q(\theta_*|\theta_*) - Q(\theta_k|\theta_*)]. \quad (72)$$

$c_k(N)$ is likewise the expectation over Y:

$$c_k(N) = \int\int [\ln(f(y, z|\theta_*)) - \ln f(y+N, z|\theta_k)] \quad (73)$$
$$f(y, z|\theta_*)dzdy$$

$$= \int\int [\ln(f(y, z|\theta_*)) - \ln f(y+N, z|\theta_k)] \quad (74)$$
$$f(z|y, \theta_*)f(y|\theta_*)dzdy$$

$$= \mathbb{E}_{Y|\theta_k}[Q(\theta_*|\theta_*) - Q_N(\theta_k|\theta_*)]. \quad (75)$$

Take the noise expectation of $c_k$ and $c_k(N)$:

$$\mathbb{E}_N[c_k] = c_k \quad (76)$$

$$\mathbb{E}_N[c_k(N)] = {}_N[c_k(N)]. \quad (77)$$

So the distance inequality $$c_k \geq \mathbb{E}_N[c_k(N)] \quad (78)$$

guarantees that noise benefits occur on average:

$$\mathbb{E}_{N,Y|\theta_k}[Q(\theta_*|\theta_*) - Q(\theta_k|\theta_*)] \geq \mathbb{E}_{N,Y|\theta_k}[Q(\theta_*|\theta_*) - Q_N(\theta_k|\theta_*)]. \quad (79)$$

The inequality condition (78) may be used to derive a more useful sufficient condition for a noise benefit. Expand the difference of relative entropy terms $c_k - c_k(N)$:

$$c_k - c_k(N) = \int\int_{Y,Z}\left(\ln\left[\frac{f(y, z|\theta_*)}{f(y, z|\theta_k)}\right] - \ln\left[\frac{f(y, z|\theta_*)}{f(y+N, z|\theta_k)}\right]\right)f(y, z|\theta_*)dydz \quad (80)$$

$$= \int\int_{Y,Z}\left(\ln\left[\frac{f(y, z|\theta_*)}{f(y, z|\theta_k)}\right] + \ln\left[\frac{f(y+N, z|\theta_k)}{f(y, z|\theta_*)}\right]\right)f(y, z|\theta_*)dydz \quad (81)$$

$$= \int\int_{Y,Z}\ln\left[\frac{f(y, z|\theta_*)f(y+N, z|\theta_k)}{f(y, z|\theta_k)f(y, z|\theta_*)}\right]f(y, z|\theta_*)dydz \quad (82)$$

$$= \int\int_{Y,Z}\ln\left[\frac{f(y+N, z|\theta_k)}{f(y, z|\theta_k)}\right]f(y, z|\theta_*)dydz. \quad (83)$$

Take the expectation with respect to the noise term N:

$$\mathbb{E}_N[c_k - c_k(N)] = c_k - \mathbb{E}_N[c_k(N)] \quad (84)$$

$$= \int_N\int\int_{Y,Z}\ln\left[\frac{f(y+n, z|\theta_k)}{f(y, z|\theta_k)}\right] \quad (85)$$
$$f(y, z|\theta_*)f(n|y)dydzdn$$

$$= \int\int_{Y,Z}\int_N\ln\left[\frac{f(y+n, z|\theta_k)}{f(y, z|\theta_k)}\right] \quad (86)$$
$$f(n|y)f(y, z|\theta_*)dndydz$$

$$= \mathbb{E}_{Y,Z,N|\theta_*}\left[\ln\frac{f(Y+N, Z|\theta_k)}{f(Y, Z|\theta_k)}\right]. \quad (87)$$

The assumption of finite differential entropy for Y and Z may ensure that ln $f(y,z|\theta)f(y,z|\theta_*)$ is integrable. Thus the integrand may be integrable. So Fubini's theorem, see G. B. Folland, Real Analysis: Modern Techniques and Their Applications (Wiley-Interscience, 1999), 2nd edition, permits the change in the order of integration in (87):

$$c_k \geq \mathbb{E}_N[c_k(N)] \text{ iff } \mathbb{E}_{Y,Z,N|\theta_*}\left[\ln\left(\frac{f(Y+N, Z|\theta_k)}{f(Y, Z|\theta_k)}\right)\right] \geq 0. \quad (88)$$

Then an EM noise benefit may occur on average if $$\mathbb{E}_{Y,Z,N|\theta_*}\left[\ln\left(\frac{f(Y+N, Z|\theta_k)}{f(Y, Z|\theta_k)}\right)\right] \geq 0. \quad (89)$$

Corollary 1:

$$\mathbb{E}_{Y,Z,N|\theta_*}\left[\ln\frac{f(Y+N,Z|\theta)}{f(Y,Z|\theta)}\right] \geq 0 \text{ if } f(y+n,z|\theta) \geq f(y,z|\theta) \quad (90)$$

for almost all y, z, and n.
Proof: The following inequalities need hold only for almost all y, z, and n:

$$f(y+n,z|\theta) \geq f(y,z|\theta) \quad (91)$$

$$\text{iff } \ln[f(y+n,z|\theta)] \geq \ln[f(y,z|\theta)] \quad (92)$$

$$\text{iff } \ln[f(y+n,z|\theta)] - \ln[f(y,z|\theta)] \geq 0 \quad (93)$$

$$\text{iff } \ln\left[\frac{f(y+n,z|\theta)}{f(y,z|\theta)}\right] \geq 0. \quad (94)$$

Thus $$\mathbb{E}_{Y,Z,N|\theta_*}\left[\ln\frac{f(Y+N,Z|\theta)}{f(Y,Z|\theta)}\right] \geq 0. \quad (95)$$

Corollary 2: Suppose $Y|_{Z=j} \sim N(\mu_j, \sigma_j^2)$ and thus $f(y|j,\theta)$ is a normal pdf. Then $$\Delta f_j(y,n) \geq 0 \quad (96)$$

holds if $$n^2 \leq 2n(\mu_j - y) \quad (97)$$

Proof: The proof compares the noisy and noiseless normal pdfs. The normal pdf is $$f(y|\theta) = \frac{1}{\sigma_j\sqrt{2\pi}}\exp\left[-\frac{(y-\mu_j)^2}{2\sigma_j^2}\right]. \quad (98)$$

So $f(y+n|\theta) \geq f(y|\theta)$ $$\text{iff } \exp\left[-\frac{(y+n-\mu_j)^2}{2\sigma_j^2}\right] \geq \exp\left[-\frac{(y-\mu_j)^2}{2\sigma_j^2}\right] \quad (99)$$

$$\text{iff } -\left(\frac{y+n-\mu_j}{\sigma_j}\right)^2 \geq -\left(\frac{y-\mu_j}{\sigma_j}\right)^2 \quad (100)$$

$$\text{iff } -(y-\mu_j+n)^2 \geq -(y-\mu_j)^2. \quad (101)$$

Inequality (101) may hold because $\sigma_j$ is strictly positive. Expand the left-hand side to get (97):

$$(y-\mu_j)^2 + n^2 + 2n(y-\mu_j) \leq (y-\mu_j)^2 \quad (102)$$

$$\text{iff } n^2 + 2n(y-\mu_j) \leq 0 \quad (103)$$

$$\text{iff } n^2 \leq -2n(y-\mu_j) \quad (104)$$

$$\text{iff } n^2 \leq 2n(\mu_j - y) \quad (105)$$

Corollary 3: Suppose $Y|_{Z=j} \sim C(m_j, d_j)$ and thus $f(y|j,\theta)$ is a Cauchy pdf. Then $$\Delta f_j(y,n) \geq 0 \quad (106)$$

holds if $$n^2 \leq 2n(m_j - y). \quad (107)$$

Proof: The proof compares the noisy and noiseless Cauchy pdfs. The Cauchy pdf is $$f(y|\theta) = \frac{1}{\pi d_j\left[1+\left(\frac{y-m_j}{d_j}\right)^2\right]}. \quad (108)$$

Then $f(y+n|\theta) \geq f(y|\theta)$ $$\text{iff } \frac{\frac{1}{\pi d_j}}{\left[1+\left(\frac{y+n-m_j}{d_j}\right)^2\right]} \geq \frac{\frac{1}{\pi d_j}}{\left[1+\left(\frac{y-m_j}{d_j}\right)^2\right]} \quad (109)$$

$$\text{iff } \left[1+\left(\frac{y-m_j}{d_j}\right)^2\right] \geq \left[1+\left(\frac{y+n-m_j}{d_j}\right)^2\right] \quad (110)$$

$$\text{iff } \left(\frac{y-m_j}{d_j}\right)^2 \geq \left(\frac{y+n-m_j}{d_j}\right)^2. \quad (111)$$

Proceed as in the last part of the Gaussian case:

$$\left(\frac{y-m_j}{d_j}\right)^2 \geq \left(\frac{y-m_j+n}{d_j}\right)^2 \quad (112)$$

$$\text{iff } (y-m_j)^2 \geq (y-m_j+n)^2 \quad (113)$$

$$\text{iff } (y-m_j)^2 \geq (y-m_j)^2 + n^2 + 2n(y-m_j) \quad (114)$$

$$\text{iff } 0 \geq n^2 + 2n(y-m_j) \quad (115)$$

$$\text{iff } n^2 \leq 2n(m_j - y). \quad (116)$$

The estimating computer system 401 that has been described herein, including each of its modules (except for the input module 403), is implemented with a computer system configured to perform the functions that have been described herein for the component. The computer system includes one or more processors, tangible memories (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens). Each module may have its own computer system or some or all of the modules may share a single computer system.

Each computer system may be a desktop computer or a portable computer, or part of a larger system, such a system that clusters algorithms for Big Data; Trains hidden Markov models for speech, natural language, and other kinds of sequential data (including DNA); that trains neural networks for speech and computer vision; identifies sequences for genomics and proteomics; reconstructs medical image in positron emission tomography; segments images for medical imaging and robotics; or estimates risks for portfolio management.

Each computer system may include one or more computers at the same or different locations. When at different locations, the computers may be configured to communicate with one another through a wired and/or wireless network communication system.

Each computer system may include software (e.g., one or more operating systems, device drivers, application programs, and/or communication programs). When software is included, the software includes programming instructions and may include associated data and libraries. When included, the programming instructions are configured to implement one or more algorithms that implement one or more of the functions of the computer system, as recited herein. The description of each function that is performed by each computer system also constitutes a description of the algorithm(s) that performs that function.

The software may be stored on or in one or more non-transitory, tangible storage devices, such as one or more hard disk drives, CDs, DVDs, and/or flash memories. The software may be in source code and/or object code format. Associated data may be stored in any type of volatile and/or non-volatile memory. The software may be loaded into a non-transitory memory and executed by one or more processors.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and advantages. These also include embodiments in which the components and/or steps are arranged and/or ordered differently.

For example, the use of Bayesian priors and penalized likelihood functions in Maximum A Posteriori and Penalized EM algorithms, other variants of the EM algorithm, and the more general class of minorization-maximization algorithms.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. An estimating computer system for iteratively estimating an unknown parameter of a model or state of a system comprising:
   an input module that has a configuration that receives numerical data about the system;
   a noise module that has a configuration that generates random, chaotic, or other type of numerical perturbations of the received numerical data or that generates pseudo-random noise;
   an estimation module that has a configuration that iteratively estimates the unknown parameter of the model or state of the system based on the received numerical data and that uses the numerical perturbations or the pseudo-random noise and the input numerical data during at least one of the iterative estimates of the unknown parameter; and
   a signaling module that has a configuration that signals when successive parameter estimates or information derived from successive parameter estimates differ by less than a predetermined signaling threshold or when the number of estimation iterations reaches a predetermined number,
wherein:
   the estimation module has a configuration that estimates the unknown parameter of the model or state of the system using maximum likelihood, expectation-maximization, minorization-maximization, or another statistical optimization or sub-optimization method,
   the noise module has a configuration that generates random, chaotic, or other type of numerical perturbations of the input numerical data that fully or partially satisfy a noisy expectation maximization (NEM) condition; and the estimation module has a configuration that estimates the unknown parameter of the model or state of the system by adding, multiplying, or otherwise combining the received numerical data with the numerical perturbations;

wherein the parameter estimates are used in one of nonlinear signal processing, statistical signal processing, pattern recognition and noise enhanced clustering.

2. The estimating computer system of claim 1 wherein:

the noise module has a configuration that generates random, chaotic, or other type of numerical perturbations of the received numerical data; and the estimation module has a configuration that iteratively estimates the unknown parameter of the model or state of the system based on the received numerical data and that uses the numerical perturbations and the input numerical data during at least one of the iterative estimates of the unknown parameter.

3. The estimating computer system of claim 1 wherein:

the noise module has a configuration that generates pseudo-random noise; and the estimation module has a configuration that iteratively estimates the unknown parameter of the model or state of the system based on the received numerical data and that uses the pseudo-random noise and the input numerical data during at least one of the iterative estimates of the unknown parameter.

4. The estimating computer system of claim 1 wherein the estimation module has a configuration that causes the magnitude of the generated numerical perturbations to eventually decay during successive parameter estimates.

5. The estimating computer system in claim 1 wherein:

the noise module has a configuration that generates numerical perturbations that do not depend on the received numerical data; and the estimation module has a configuration that estimates the unknown parameter of the model or state of the system using the numerical perturbations that do not depend on the received numerical data.

6. The estimating computer system in claim 1 wherein:

the system is a model and the model is a probabilistically weighted mixture of probability curves including a scalar or vector Gaussian and Cauchy curves; and the noise module has a configuration that causes the generated numerical perturbations or pseudo-random noise to fully or partially satisfy a mixture-based NEM condition, including a component-wise quadratic NEM condition.

7. An estimating computer system for iteratively estimating an unknown parameter of a model or state of a system comprising:

an input module that has a configuration that receives numerical data about the system;

a noise module that has a configuration that generates random, chaotic, or other type of numerical perturbations of the received numerical data or that generates pseudo-random noise;

an estimation module that has a configuration that iteratively estimates the unknown parameter of the model or state of the system based on the received numerical data and that uses the numerical perturbations or the pseudo-random noise and the input numerical data during at least one of the iterative estimates of the unknown parameter; and a signaling module that has a configuration that signals when successive parameter estimates or information derived from successive parameter estimates differ by less than a predetermined signaling threshold or when the number of estimation iterations reaches a predetermined number, wherein:

the estimation module has a configuration that estimates the unknown parameter of the model or state of the system using maximum likelihood, expectation-maximization, minorization-maximization, or another statistical optimization or sub-optimization method, the noise module has a configuration that generates numerical perturbations that do not depend on the received numerical data, the estimation module has a configuration that estimates the unknown parameter of the model or state of the system using the numerical perturbations that do not depend on the received numerical data, and the estimation module has a configuration that causes the magnitude of the generated numerical perturbations that do not depend on the received numerical data to eventually decay during successive parameter estimates;

wherein the parameter estimates are used in one of nonlinear signal processing, statistical signal processing, pattern recognition and noise enhanced clustering.

8. Non-transitory, tangible, computer-readable storage media containing a program of instructions that causes a computer system running the program of instructions to function as an estimating computer system for iteratively estimating an unknown parameter of a model or state of a system that:

receives numerical data about the system;

generates random, chaotic, or other type of numerical perturbations of the received numerical data or that generates pseudo-random noise;

iteratively estimates the unknown parameter of the model or state of the system based on the received numerical data and that uses the numerical perturbations or the pseudo-random noise and the input numerical data during at least one of the iterative estimates of the unknown parameter; and determines whether successive parameter estimates or information derived from successive parameter estimates differ by less than a predetermined signaling threshold and, if so, signals when this occurs, wherein the program of instructions causes the computer system running the program of instructions to function as an estimating computer system that:

estimates the unknown parameter of the model or state of the system using maximum likelihood, expectation-maximization, minorization-maximization, or another statistical optimization or sub-optimization method;

generates random, chaotic, or other type of numerical perturbations of the input numerical data that fully or partially satisfy a noisy expectation maximization (NEM); and estimates the unknown parameter of the model or state of the system by adding, multiplying, or otherwise combining the input data with the numerical perturbations;

wherein the parameter estimates are used in one of nonlinear signal processing, statistical signal processing, pattern recognition and noise enhanced clustering.

9. The storage media of claim 8 wherein the program of instructions causes the computer system running the program of instructions to function as the estimating computer system that:
- generates random, chaotic, or other type of numerical perturbations of the received numerical data; and
- iteratively estimates the unknown parameter of the model or state of the system based on the received numerical data and that uses the numerical perturbations and the input numerical data during at least one of the iterative estimates of the unknown parameter.

10. The storage media of claim 8 wherein the program of instructions causes the computer system running the program of instructions to function as an estimating computer system that:
- generates pseudo-random noise; and
- iteratively estimates the unknown parameter of the model or state of the system based on the received numerical data and that uses the pseudo-random noise and the input numerical data during at least one of the iterative estimates of the unknown parameter.

11. The storage media of claim 8 wherein the program of instructions causes the magnitude of the generated numerical perturbations to eventually decay during successive parameter estimates.

12. The storage media of claim 8 wherein the program of instructions causes the computer system running the program of instructions to function as an estimating computer system that:
- generates numerical perturbations that do not depend on the received numerical data; and
- estimates the unknown parameter of the model or state of the system using the numerical perturbations that do not depend on the received numerical data.

13. Non-transitory, tangible, computer-readable storage media containing a program of instructions that causes a computer system running the program of instructions to function as an estimating computer system for iteratively estimating an unknown parameter of a model or state of a system that:
- receives numerical data about the system;
- generates random, chaotic, or other type of numerical perturbations of the received numerical data or that generates pseudo-random noise;
- iteratively estimates the unknown parameter of the model or state of the system based on the received numerical data and that uses the numerical perturbations or the pseudo-random noise and the input numerical data during at least one of the iterative estimates of the unknown parameter; and
- determines whether successive parameter estimates or information derived from successive parameter estimates differ by less than a predetermined signaling threshold and, if so, signals when this occurs,
- wherein the program of instructions causes the computer system running the program of instructions to function as an estimating computer system that:
  - estimates the unknown parameter of the model or state of the system using maximum likelihood, expectation-maximization, minorization-maximization, or another statistical optimization or sub-optimization method;
  - generates numerical perturbations that do not depend on the received numerical data;
  - estimates the unknown parameter of the model or state of the system using the numerical perturbations that do not depend on the received numerical data; and
  - causes the magnitude of the generated numerical perturbations to eventually decay during successive parameter estimates;
- wherein the parameter estimates are used in one of nonlinear signal processing, statistical signal processing, pattern recognition and noise enhanced clustering.

14. Non-transitory, tangible, computer-readable storage media containing a program of instructions that causes a computer system running the program of instructions to function as an estimating computer system for iteratively estimating an unknown parameter of a model or state of a system that:
- receives numerical data about the system;
- generates random, chaotic, or other type of numerical perturbations of the received numerical data or that generates pseudo-random noise;
- iteratively estimates the unknown parameter of the model or state of the system based on the received numerical data and that uses the numerical perturbations or the pseudo-random noise and the input numerical data during at least one of the iterative estimates of the unknown parameter; and
- determines whether successive parameter estimates or information derived from successive parameter estimates differ by less than a predetermined signaling threshold and, if so, signals when this occurs,
- wherein the program of instructions causes the computer system running the program of instructions to function as an estimating computer system that:
  - estimates the unknown parameter of the model or state of the system using maximum likelihood, expectation-maximization, minorization-maximization, or another statistical optimization or sub-optimization method;
  - the system is a model and the model is a probabilistically weighted mixture of probability curves including a scalar or vector Gaussian and Cauchy curves; and
  - the program of instructions causes the computer system running the program of instructions to function as an estimating computer system that causes the generated numerical perturbations or pseudo-random noise to fully or partially satisfy a mixture-based noisy expectation maximization (NEM) condition, including a component-wise quadratic NEM condition;
- wherein the parameter estimates are used in one of nonlinear signal processing, statistical signal processing, pattern recognition and noise enhanced clustering.

* * * * *